United States Patent [19]

Grossi

[11] Patent Number: 5,031,849
[45] Date of Patent: Jul. 16, 1991

[54] MACHINE FOR THE MANUFACTURE OF COMPONENTS BY WINDING A SERIES OF FILMS TO FORM A COIL

[75] Inventor: Francesco Grossi, Bologna, Italy
[73] Assignee: Arcotronics Italia SpA, Italy
[21] Appl. No.: 350,094
[22] Filed: May 10, 1989

[30] Foreign Application Priority Data

May 17, 1988 [GB] United Kingdom ............ 8811627
Aug. 3, 1988 [IT] Italy .................... 21631 A/88

[51] Int. Cl.$^5$ ............................. B65H 39/16
[52] U.S. Cl. ...................... 242/56.1; 242/7.11
[58] Field of Search ............ 242/7.09, 7.08, 7.14, 242/7.15, 56.1, 7.11

[56] References Cited

U.S. PATENT DOCUMENTS 3,521,338  7/1970  Pietro ................ 242/56.1 X
4,055,310 10/1977  Bonaiti .............. 242/7.09 X
4,265,410  5/1981  Fanning ............... 242/56.1

FOREIGN PATENT DOCUMENTS 55-98815  7/1980  Japan ................. 242/7.09
845186    7/1981  U.S.S.R. ............. 242/56.1

Primary Examiner—Katherine Matecki
Attorney, Agent, or Firm—Carl A. Forest

[57] ABSTRACT

A winding machine for electrical components has a plurality of spindle assemblies each of which can be brought in turn successively into a series of operating stations, each spindle assembly comprising clutch means and spindle operating means so arranged that when the spindle assembly is at a selected operating station a spindle of the assembly may be driven and/or the spindle otherwise operated, the machine comprising a single motor arranged to drive the spindle of the spindle assemblies at more than one of the operating stations.

6 Claims, 3 Drawing Sheets

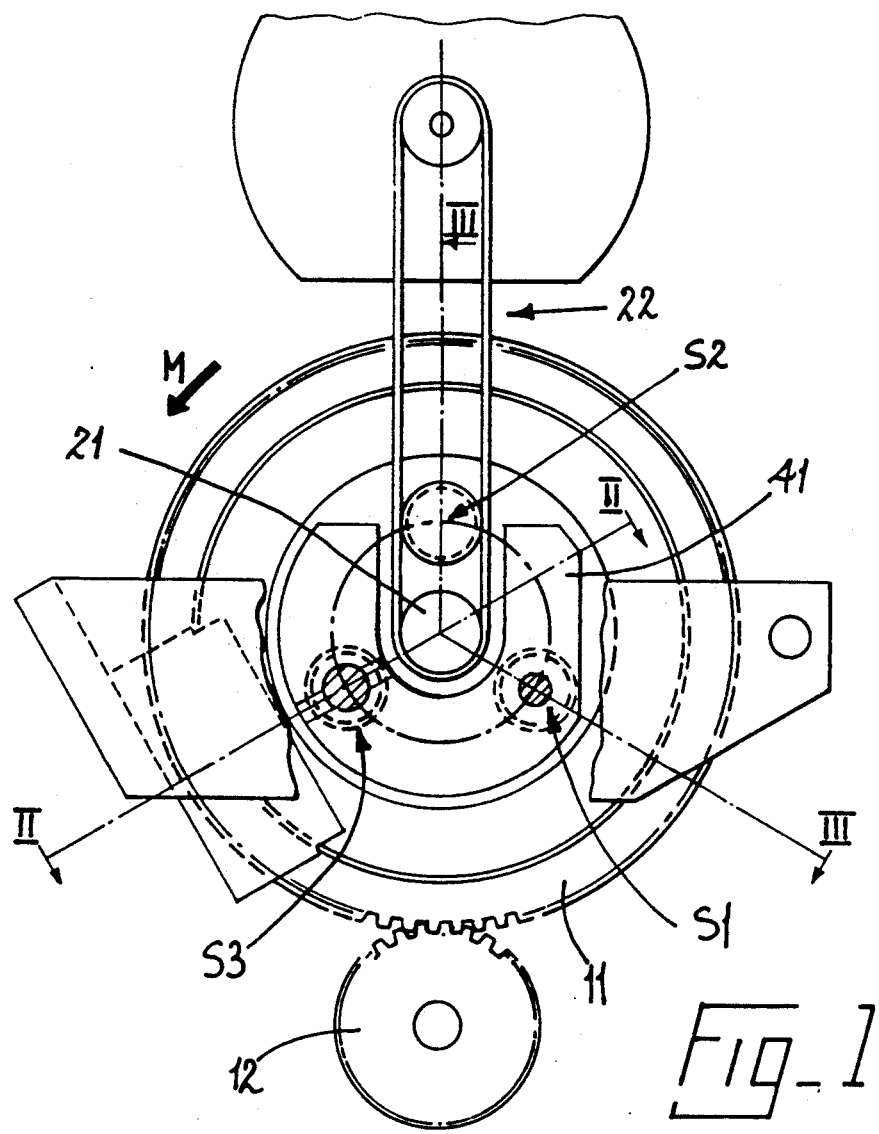
Fig_1
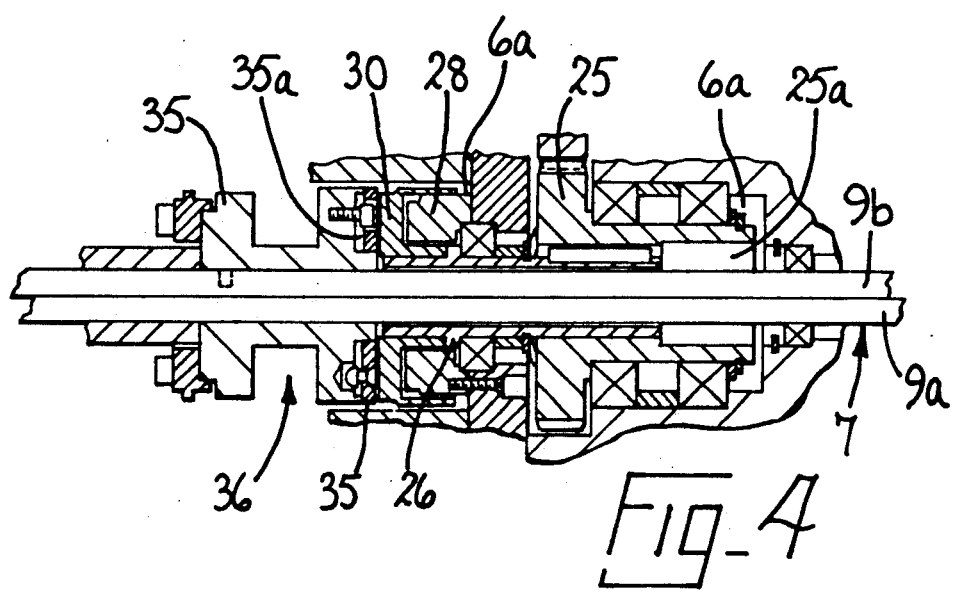
Fig_4

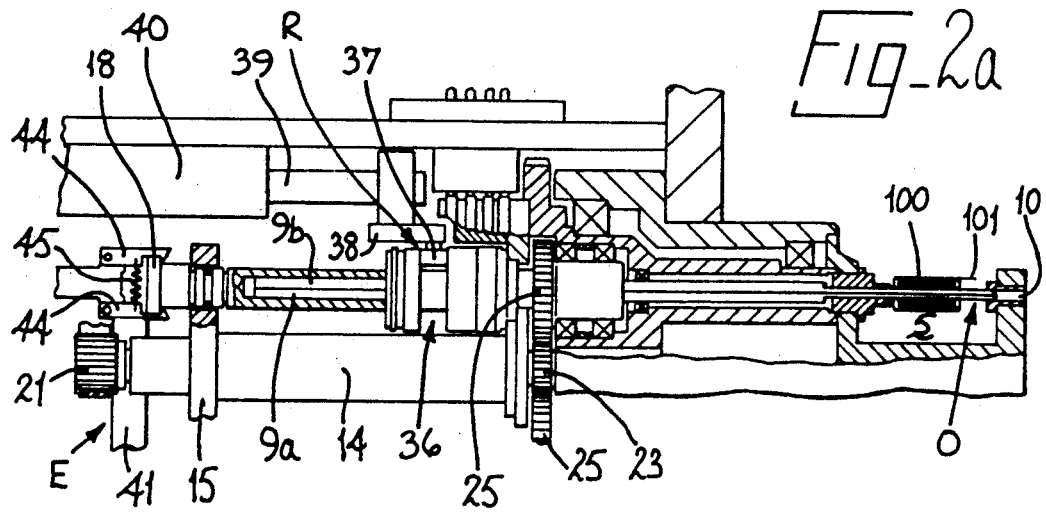
Fig_2a
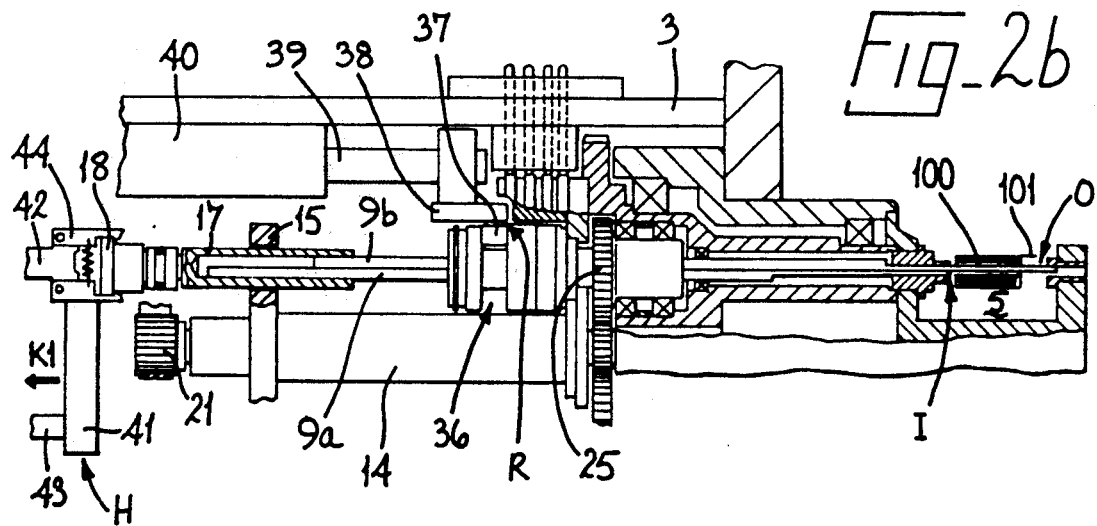
Fig_2b
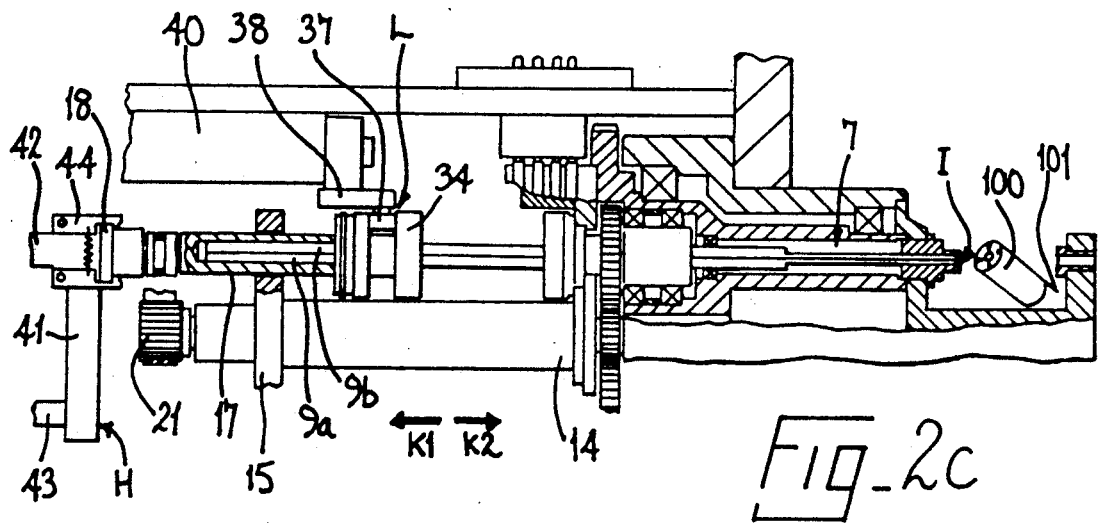
Fig_2c

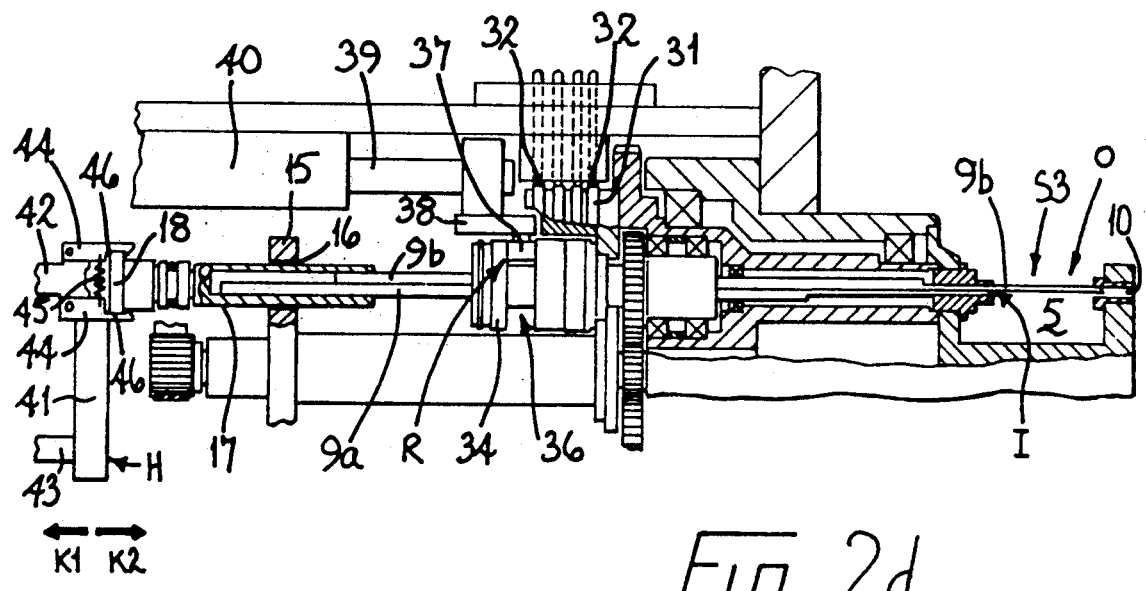
Fig_2d
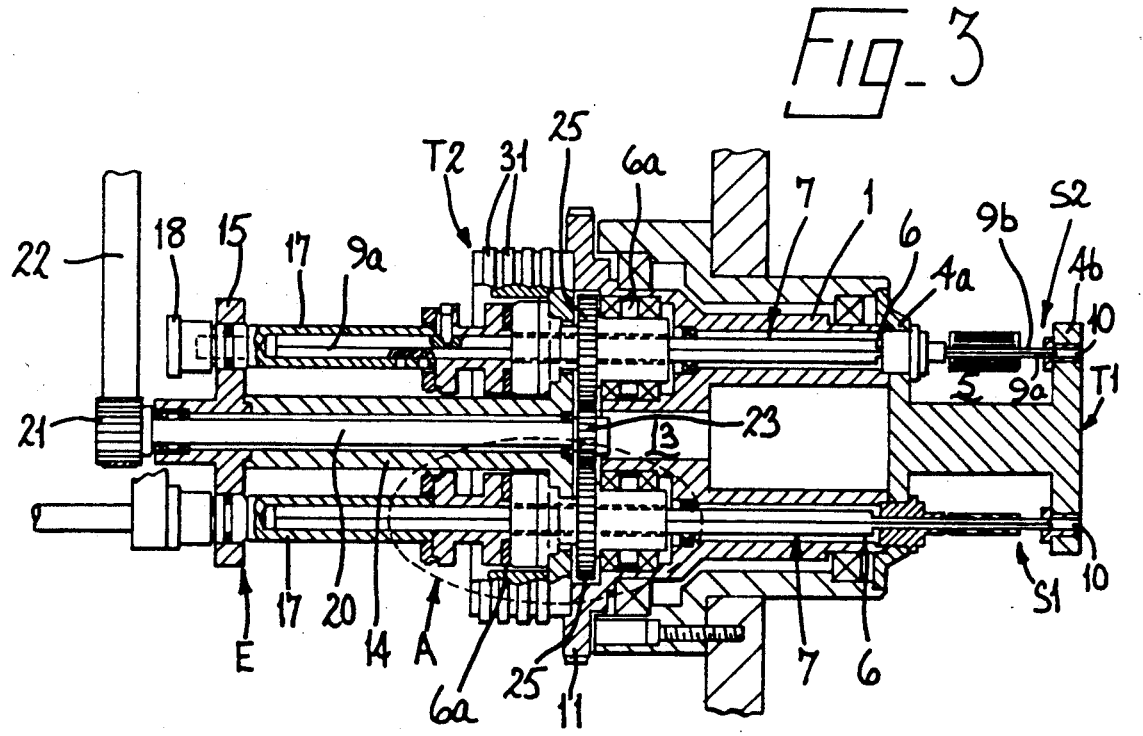
Fig_3

MACHINE FOR THE MANUFACTURE OF COMPONENTS BY WINDING A SERIES OF FILMS TO FORM A COIL

BACKGROUND OF THE INVENTION

The invention relates to a machine for the manufacture of components by winding one or more films to form a coil.

DESCRIPTION OF THE PRIOR ART

It is known that certain electrical components, whether passive, for example capacitors or active, for example batteries, can be produced by placing two or more films together so that their corresponding faces come into contact with one another.

The capacitance of a capacitor, for example, depends on the surface area of the two films whose faces are brought into contact with one another and on the nature and thickness of the dielectric.

In the case of a battery, the properties obtained, for example the amperage per hour, depend on the surface area of the two films respectively comprising the cathode and the anode and on the electrolyte held by a separating sheet placed between the said anode and cathode.

In order to increase, for example the capacitance of a capacitor or the amperage per hour of a battery the surface area of the active surfaces in contact with each other must be increased.

One method by which this can be achieved is by winding the films to form a coil, which has the advantageous effect of reducing the overall dimensions of the component produced.

In some of the components of this type an additional film which has a solely protective purpose, is wound round the component shortly before its completion. In other components, at least one metal tang is inserted, making an electrical connection at one end of the component with a particular film when winding has been completed and protruding from the other end of the component. In the case of a battery the tang may make an electrical connection with the cathode or anode.

Machines for winding two or more coils simultaneously are known.

These machines feature a winding station with a spindle comprising two pins, each with a semi-circular section that, together, form a circular section.

The said pins may be moved along their axes at different times in such a way as to grip a transverse portion of two or more superimposed films, unwound from the same number of reels, between them in the said winding station.

Subsequent synchronous rotation of said pins makes it possible for a coil to be wound around them.

Before the spindle stops, the said films are cut upstream of the station. The tail of the said films is wound round and fixed to the body of the component obtained, which then falls downwards following its release by the said pins.

Suitable means position the transverse edges of the said films, unwound from the reels, in the said station, allowing a new cycle for the production of components to begin.

Machines are known which are fitted with a frame that rotates intermittently to stations at 180° to one another, which machines are fitted with two spindles of the type described above.

Each spindle is situated at a first station where winding is started, and then subsequently, following the 180° rotation of the frame, moved to a second station where winding is completed.

The films of the component being produced around the spindle situated in the second station move through the first station, so that when the spindle in the second station stops, the films may be gripped by means of the pins of the spindle situated at the first station.

When the films are cut downstream of the first station, production of the component wound around the spindle situated in the second station may be completed, and the production of a new component around the spindle situated in the first station may be begun.

It is a disadvantage of known machines for the manufacture of wound components, that the overall cycle time is extended by the fact that components at stages in the manufacture other than winding may be subjected to undue idle time.

SUMMARY OF THE INVENTION

It is an object of the present invention to provide a machine for the manufacture of electrical components by winding one or more films to form a coil in which machine the disadvantages of the known machines are reduced or substantially obviated.

It is a particular object of the present invention to provide a machine of this type which comprises a plurality of spindle assemblies, each of which is moved through a succession of operating stations during the manufacturing cycle.

It is a further object of the present invention to provide a machine in which the overall cycle time is reduced, and in which there is increased flexibility of operation, providing the possibility for a number of different manufacturing operations to be carried out simultaneously, each at a different operating station.

The present invention provides a machine for the manufacture of electrical components by winding one or more films to form a coil comprising;

(a) a machine frame comprising a head supporting a rotatably mounted turret and a plurality of operating stations in the head equiangularly spaced around the axis of rotation of the turret, (b) a plurality of spindle assemblies mounted in the turret and spaced equiangularly around the axis of rotation correspondingly to the operating stations, (c) means for intermittently rotating the turret to bring each spindle assembly successively into position at each of the operating stations, (d) clutch engaging means at at least two, selected, operating stations, and (e) spindle operating means at at least one, selected, operating station, wherein each spindle assembly comprises;

(f) a rotatable, longitudinally split, spindle comprising a first and a second parallel pin each of which is capable of movement along its longitudinal axis independently of the other between an operating and an idle position, (g) clutch means to effect rotation of the spindle, and (h) first and second pin operating means to move the first and second pins between their operating and idle positions, and wherein the machine comprises one motor which may be connected through the clutch engaging means at the selected operating stations rotatably to drive the spindle of a spindle assembly at such operating stations, and wherein the spindle operating means at its selected operating stations serves to operate the pin operating means of a spindle assembly at such operating stations.

BRIEF DESCRIPTION OF THE DRAWINGS

The invention will now be further described with reference to the accompanying drawings, which illustrate an embodiment of the machine according to the invention, in which;

FIG. 1 is a view of the machine from the rear, partially in diagrammatic form;

FIGS. 2a, 2b, 2c and 2d are views of the machine showing the spindle assembly in detail on the line II—II of FIG. 1, showing the assembly in different stages of operation;

FIG. 3 is a view of the machine on the line III—III of FIG. 1 and;

FIG. 4 is an enlarged view of the section of the machine circled as A on FIG. 3, showing this part of the machine in more detail.

DESCRIPTION OF THE PREFERRED EMBODIMENT

The preferred embodiment of a machine according to the present invention for the manufacture of electrical components by winding one or more films to form a coil, comprises, a machine frame 3 comprising a head T1 supporting a rotatably mounted turret 1 and three operating stations S1, S2 and S3 in the head equiangularly spaced around the axis of rotation of the turret 1, three spindle assemblies each mounted in a hole 6 in the turret 1 and spaced equiangularly around the axis of rotation, corresponding to the operating stations, motor means (not shown) for intermittently rotating the turret 1 to bring each spindle assembly successively into position at each of the operating stations, clutch engaging means 28 at each operating station and spindle operating means at operating station S3.

The machine further comprises a motor which may be connected through the clutch engaging means 28 at each operating station rotatably to drive the spindle 7 of a spindle assembly at that operating station. The machine further comprises spindle operating means at operating station S3 to operate the pin operating means of a spindle assembly at this operating station.

The head T1 comprises two side pieces 4a and 4b perpendicular to the axis of rotation of the head, which define an operating space 5 in which the component is manufactured.

Each spindle assembly comprises a rotatable, longitudinally split, spindle 7, comprising a first and a second parallel pin 9a, 9b, each of which is capable of movement along its longitudinal axis independently of the other between an operating position O and an idle position I, a magnetic clutch to effect rotation of the spindle 7 and first and second pin operating means to move the first and second pins between their operating and idle positions.

Each of the pins 9a and 9b has a semi-circular section and is in contact with the other pin along its flat face. Each pin can be moved along its longitudinal axis into the operating space 5 until it is inserted in a corresponding seat 10 in the outer side piece 4b.

At the end remote from the operating space, the pins 9a and 9b of each spindle assembly are inserted into a sleeve 17, the first pin 9a being rigidly attached to this sleeve. The three sleeves 17 are each inserted as a sliding fit into a hole 16 in a disc 15 which is mounted on the end of a cylindrical tubular element 14. Each sleeve 17 projects from the disc 15 on the opposite side from the turret and is provided with an annular projection 18 on its free end.

The element 14 is mounted in an axial hole 13 provided in a head T2 mounted on the turret 1, remote from the operating space 5.

The inner surface of the longitudinal hole of the element 14 supports a shaft 20 which is fitted at its free end with a pinion 21 which engages with transmission means 22, such as a toothed belt. A pinion 23 is keyed to the other end of the shaft 20, located in the hole 13.

The diameter of each of the holes 6, at the end of the turret remote from the operating space 5, is enlarged to form a recess 6a. A toothed wheel 25 is rotatably supported in each recess 6a, a hole 25a passing through the wheel and housing a fixed bush 26, which bush protrudes towards the head T2. One of the three spindles 7 is inserted as a sliding fit in each said bush 26. Each of the three toothed wheels 25 is in constant engagement with the pinion 23.

The clutch means for selectively effecting rotation of each spindle comprises a magnetic clutch. A coil 28 is located in each recess 6a, and operates in conjunction with a ring 30 made of magnetic iron material and formed as an integral part of bush 26. Each coil 28 is powered by a conductor ring 31, the conductor rings being selectively coupled by a sliding pick-up means 32 to a power supply (not shown), control means being provided to power the three coils 28 independently. A fourth, common, conductor ring 31 is located on the outside of the turret 1 near head T2.

The spindle 7 is inserted in a collar 34, to which the second pin 9b is rigidly attached. An armature 35 made from magnetic iron material is mounted on the face of the collar 34 facing the ring 30, elastic means 35a being located between the armature and the collar.

The spindle assembly further comprises means by which the pins 9a, 9b can be moved independently along their longitudinal axes.

Pin 9a is rigidly attached to sleeve 17, with its annular projection 18.

At the unloading station S3, two ratchet gears 44, connected to one another by elastic means 45, are hinged to a pusher 41, located on the side of disc 15 remoted from the turret. The pusher 41, which is made in a U-shape, to avoid fouling of the pinion 21 and associated transmission means 22, is constrained to move in a direction parallel to the axis of rotation of the turret 1 by means of a rod 42 of a pneumatic jack, its movement being guided by a rod 43. The ratchet gears 44 are provided with throats 46, one per ratchet gear, which provide improved coupling with the projection 18.

Pin 9b is rigidly attached to the collar 34, which is provided with a circumferential throat 36 on its outer side. At the unloading station S3, a roller 37 which is mounted on an arm 38, supported so that it projects from the rod 39 of a pneumatic jack 40, is inserted in the throat 36.

The outside of the turret 1 is in the form of a toothed crown 11, which co-operates with a pinion 12 (FIG. 1) by which it may be rotated in direction M. The turret 1 is rotated intermittently, each time passing through an angle of 120°.

The operation of the machine will now be described with reference to the manufacture of a component, in which manufacturing cycle at station S1, the winding operation is carried out, at station S2 the component is covered with a protective film and at station S3 the component is unloaded from the spindle assembly and the spindle re-loaded.

FIGS. 2a, 2b, 2c and 2d show the configuration of the pins of the spindle assembly at different stages in the manufacturing cycle at operating station S3. FIG. 2a shows the assembly with both pins in the operating position, holding a completed component immediately prior to unloading; FIG. 2b shows the assembly with one pin in the operating position and the other pin withdrawn to the idle position, during unloading; FIG. 2c shows the assembly with both pins withdrawn to the idle position, releasing the component and FIG. 2d shows the spindle assembly prior to the commencement of loading, with one pin in the operating position and the other pin in the idle position.

In FIG. 2a, the pusher 41 is positioned in its extreme position E, and pins 9a and 9b are in the operating position O. Roller 37 is in its idle position R.

Activation of the jack associated with rod 42 causes the pusher to be moved, in direction K1, from its position E to its position H as shown in FIG. 2b. This, causes the sleeve 17 (held by the ratchet gears) to be moved, consequently moving the first pin 9a from its operating position O to its idle position I.

The jack 40 is activated in appropriate synchrony with the above, making its associated rod 39 first complete a stroke in direction K1, and subsequently an equal stroke in the opposite direction K2.

This causes collar 34 and hence the second pin 9b to be moved by means of roller 37.

When the roller 37 is returned said second pin 9b returns to its operating position O, as shown in FIG. 2d. In this configuration, the pusher 41 is in its extreme inner position H, and roller 37 in its extreme idle position R.

At this point the turret 1 is rotated through 120° in direction M, which disengages the throat 36 from the roller 37, and the annular projection 18 from the ratchet gears 44.

After this rotation, each of the three spindle assemblies occupies the next operating stations.

After the rotation, the pusher 41 is moved from its extreme outer position E to the inner position H; which returns said first pin 9a to its operating position O, and at the end of the pusher's stroke, engages the ratchet gears 44 with the projection 18.

The spindle assemblies remain in stations S1, S2, S3 for a pre-set period of time, during which they can be made to rotate. Rotation of the spindle assemblies is brought about by activation of the coil 28, which can be achieved independently at each station at any desired time in the cycle.

The machine is provided with central motor means which turn the toothed wheels 25 simultaneously, each of the latter being employed, when necessary, to drive the corresponding spindle assembly. In order to reduce friction as far as possible, each spindle assembly runs on bearings 50 which, in the operating position, are located in the hole 16.

The machine is used to manufacture components 100, by winding one or more films into a coil. In the case of a battery the films would be films forming the cathode, anode and separating element subsequently impregnated with an electrolyte of the battery.

These films are gripped by pins 9a, 9b of the spindle assembly. Subsequent rotation of the spindle winds these films to form a coil.

The component 100 may be completed by making use of station S2, in which, for example, a conductor tang 101 can be axially inserted into the component making an electrical connection with one of the wound films, or in which a film having the function of containing the active films, or of protecting them, can be wound round them.

Tests or measurements can be carried out on the component 100 at the station S2, or at the unloading station S3, at which, upon completion of the relevant operating cycle; the component falls downwards as shown in FIG. 2c when released by pins 9a, 9b.

Because of the great flexibility in operation used for the manufacture of different types of wound components with specific characteristics, designed for specific uses, for example, capacitors and batteries.

It will be realized that to obtain the maximum flexibility of the machine, the prepared embodiment could be modified so that at each operating station the machine comprises spindle operating means and clutch engaging means, which may be arranged to cause each spindle assembly in turn to perform the desired operation.

I claim:

1. A machine for the manufacture of electrical components by winding one or more films to form a coil comprising:
    (a) a machine frame comprising a head supporting a rotatably mounted turret and a plurality of operating stations in the head equiangularly spaced around the axis of rotation of the turret,
    (b) a plurality of spindle assemblies mounted in the turret and spaced equiangularly around the axis of rotation correspondingly to the operating stations,
    (c) means for intermittently rotating the turret to bring each spindle assembly successively into position at each of the operating stations,
    (d) clutch engaging means at at least two selected operating stations, and
    (e) spindle operating means at at least one selected operating station,
    wherein each spindle assembly comprises:
    (f) a rotatable, longitudinally split spindle comprising a first and a second parallel pin, each of which is capable of movement along its longitudinal axis independently of the other between an operating and an idle position,
    (g) clutch means to effect rotation of the spindle, and
    (h) first and second pin operating means to move the first and second pins between their operating and idle positions, each of said first and second pin operating means comprising pin moving means for independently moving a plurality of spindle pins in said plurality of spindle assemblies between their operating and idle positions, said pin operating means including one pusher member and spindle pin coupling means for selectively coupling said one pusher member to each of said spindle assemblies,
    and wherein the machine comprises one motor which may be connected through the clutch engaging means at the selected operating stations rotatably to drive the spindle of a spindle assembly at such operating stations, and wherein the spindle operating means at its selected operating stations serves to operate the pin operating means of a spindle at such operating stations.

2. A machine according to claim 1, which comprises three operating stations.

3. A machine according to claim 1 or claim 2, in which clutch engaging means are provided at each operating station.

4. A machine according to claim 3, in which the clutch means is a magnetic clutch.

5. A machine according to claim 1, in which spindle operating means are provided at one selected operating station.

6. A machine in accordance with claim 1 wherein said spindle pin coupling means comprises a plurality of ratchet gears connected by elastic means.

* * * * *